Aug. 19, 1969          N. R. TOFFOLON                3,462,025
              APPARATUS FOR ERECTING PREFABRICATED
                     PANELS AND THE LIKE
Original Filed Sept. 29, 1966                    11 Sheets-Sheet 1

INVENTOR.
NORMAN R. TOFFOLON

BY McCormick, Paulding & Huber

ATTORNEYS

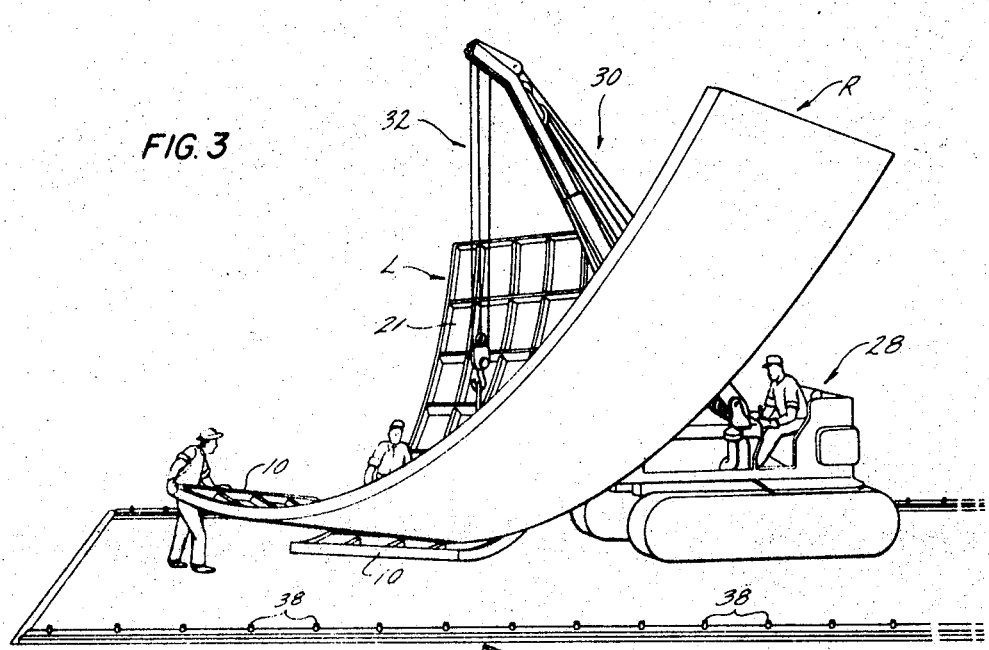
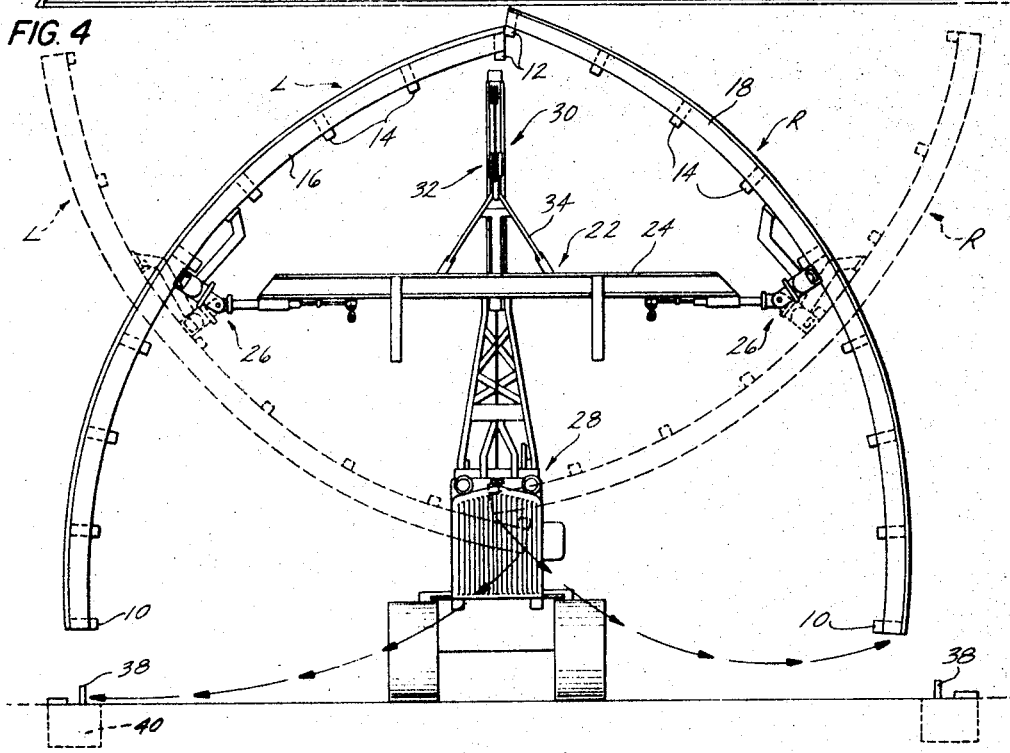

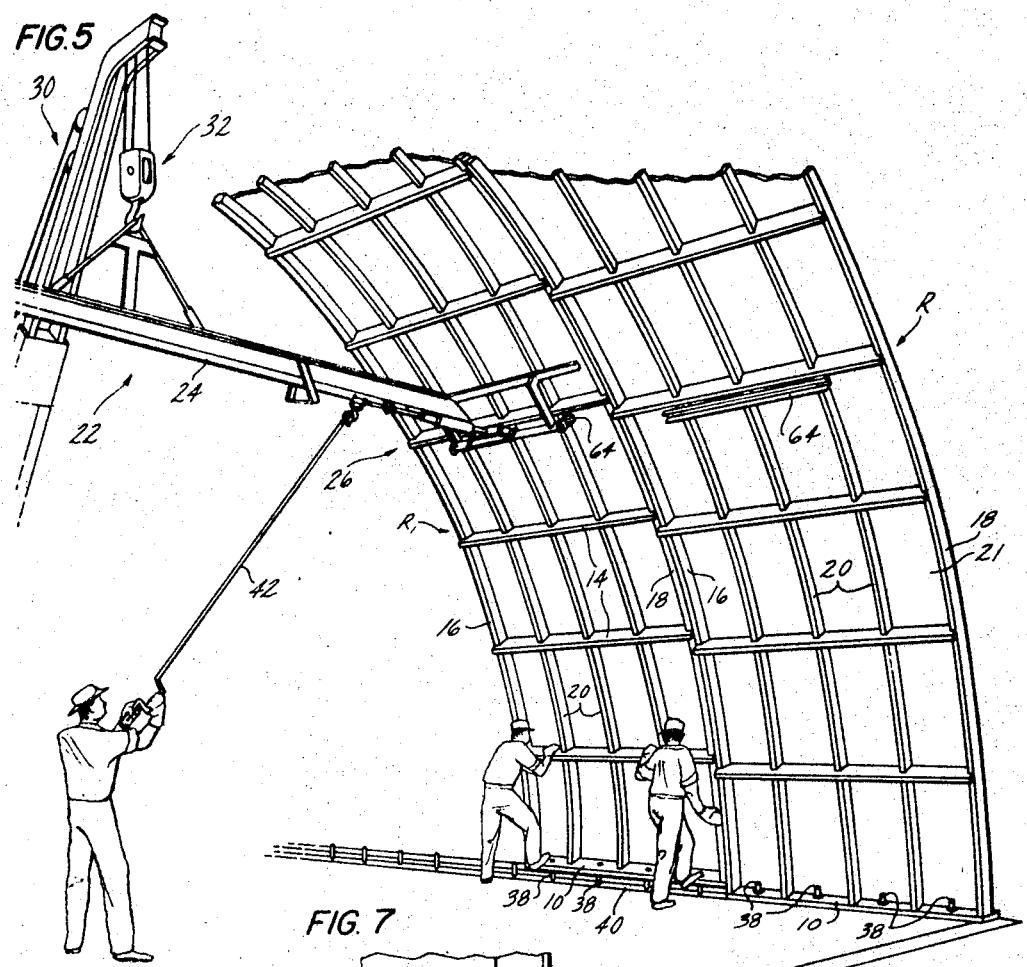

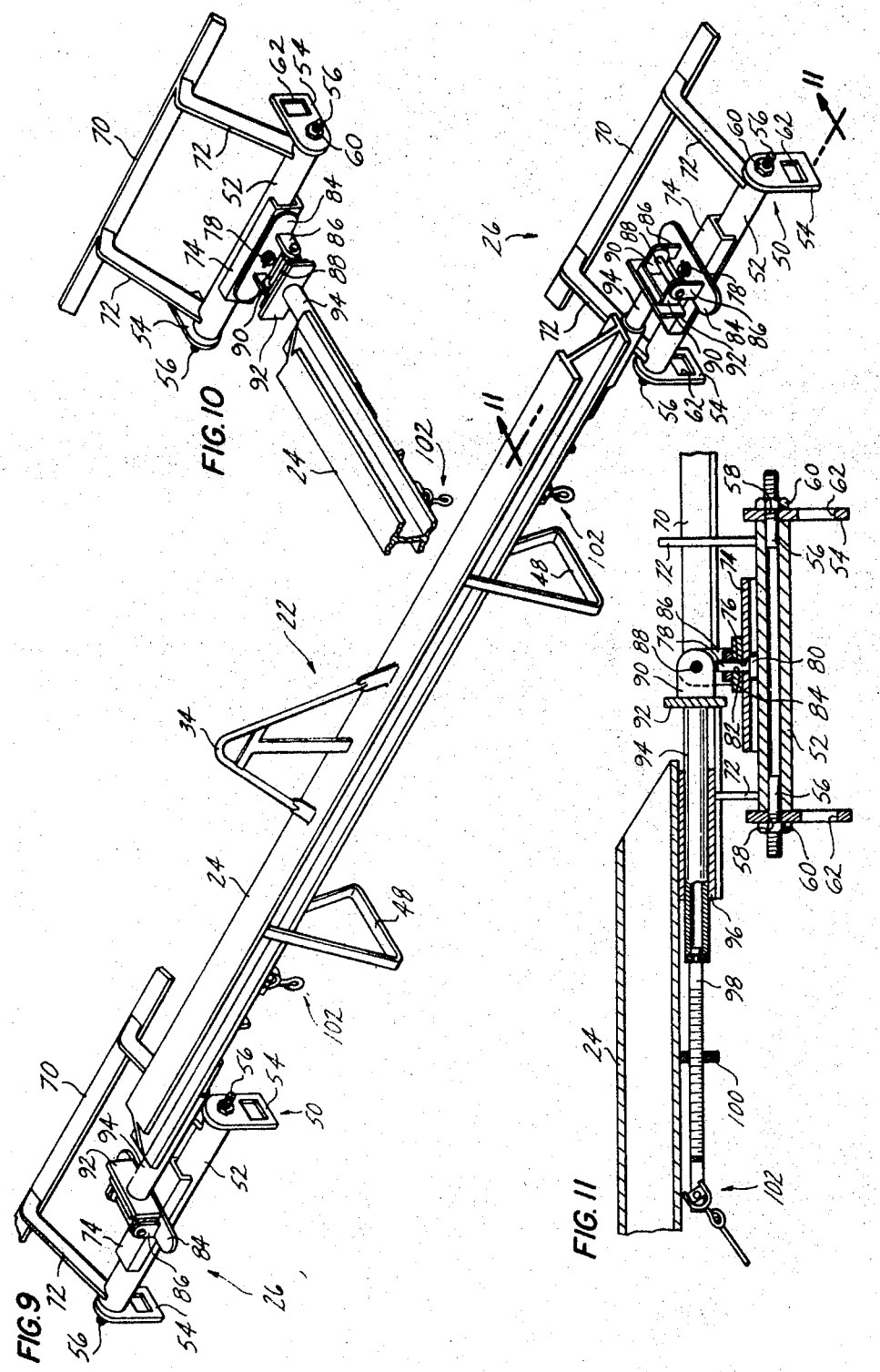

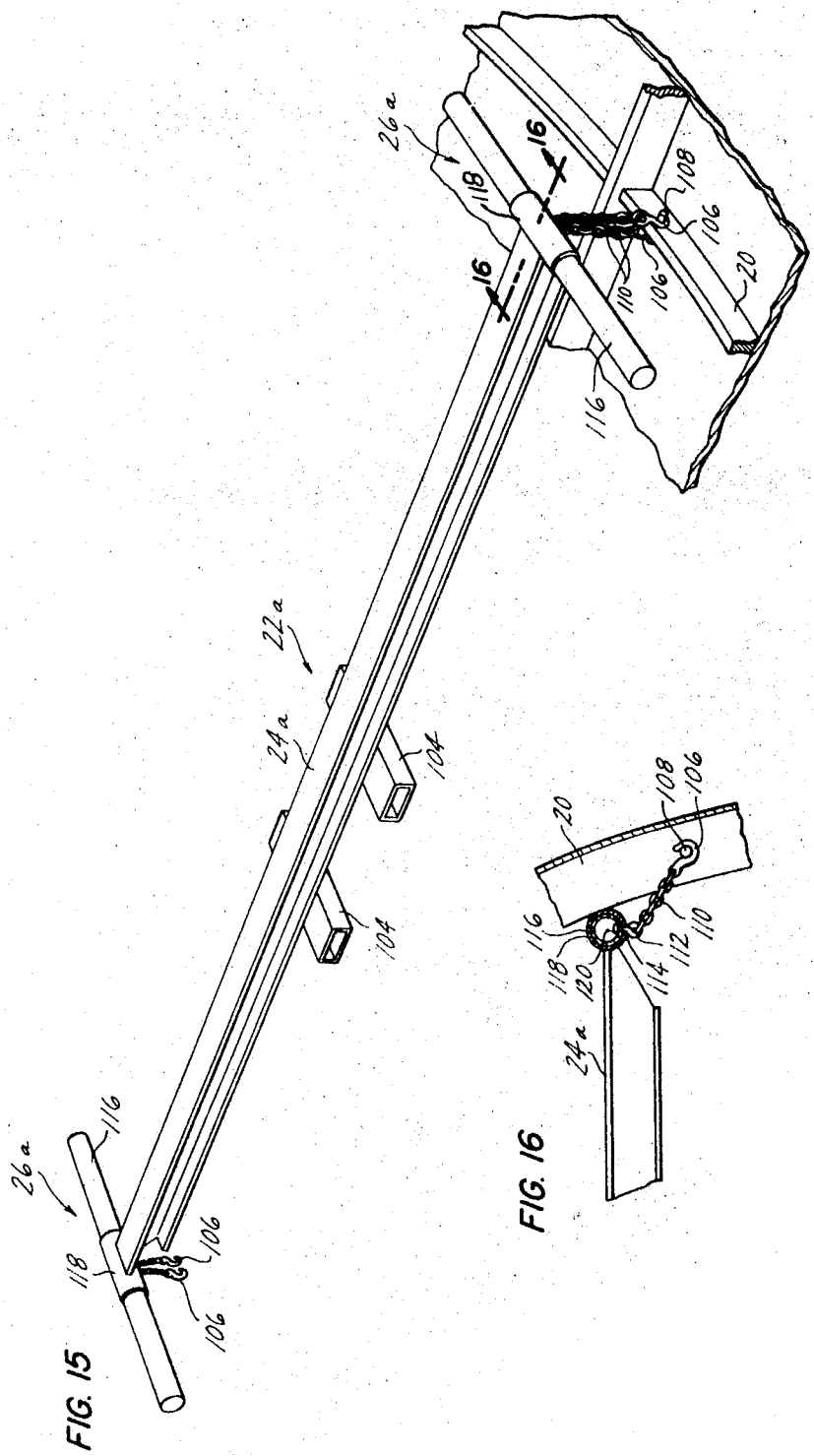

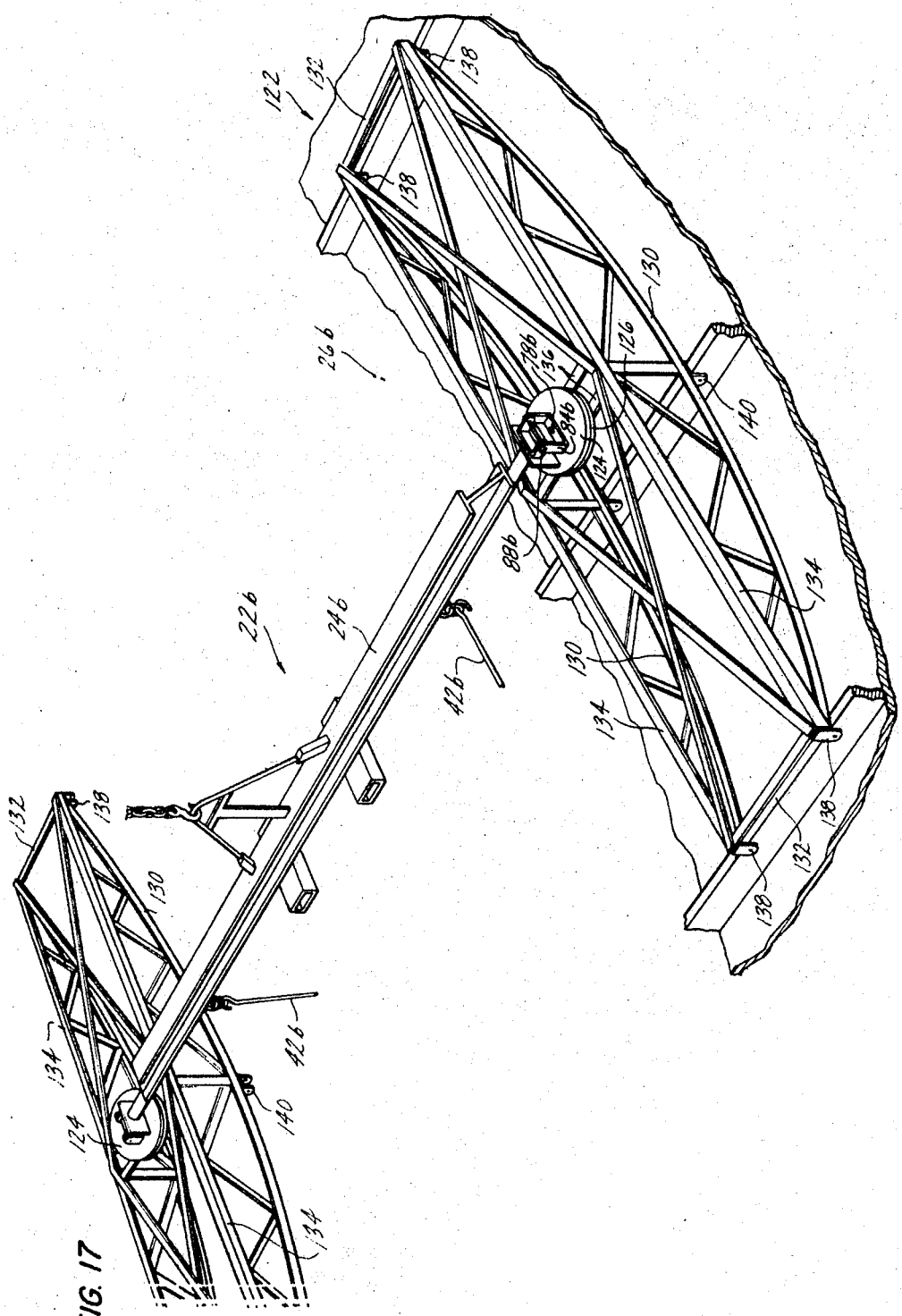

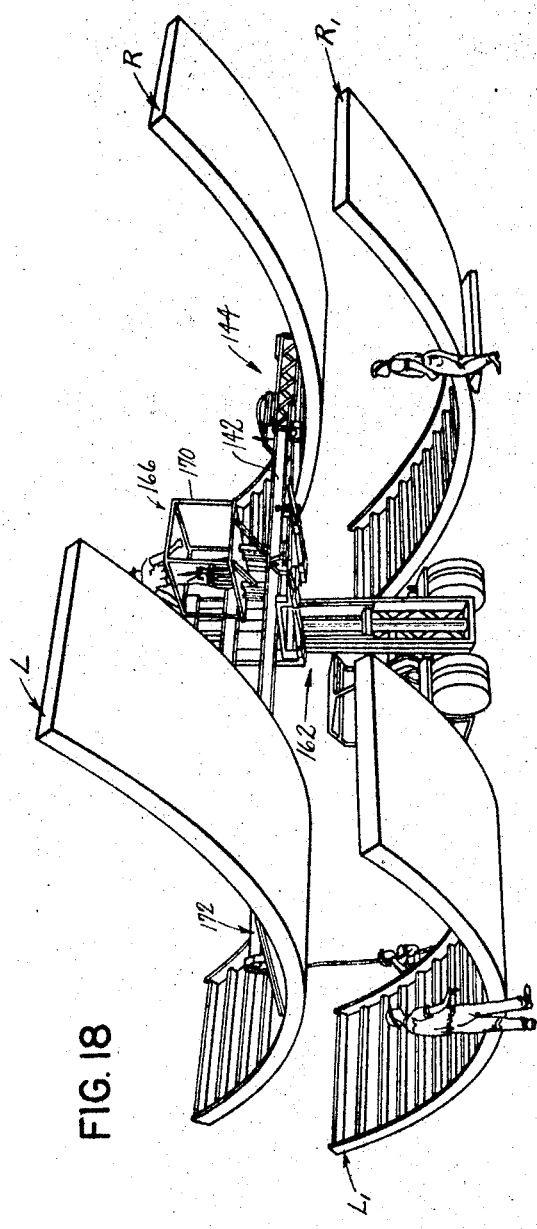
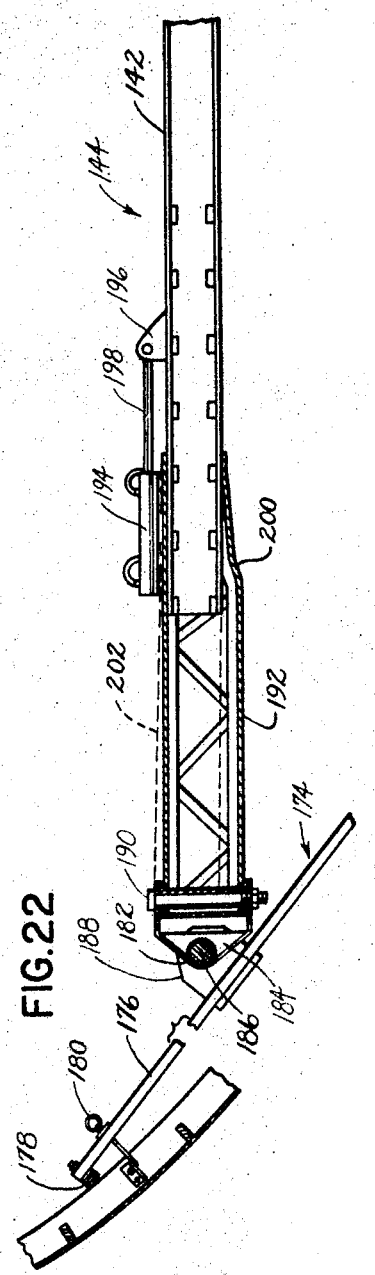
FIG. 18
FIG. 22

Aug. 19, 1969     N. R. TOFFOLON     3,462,025
APPARATUS FOR ERECTING PREFABRICATED
PANELS AND THE LIKE
Original Filed Sept. 29, 1966     11 Sheets-Sheet 10

Aug. 19, 1969 N. R. TOFFOLON 3,462,025
APPARATUS FOR ERECTING PREFABRICATED
PANELS AND THE LIKE
Original Filed Sept. 29, 1966 11 Sheets-Sheet 11

United States Patent Office 3,462,025
Patented Aug. 19, 1969

3,462,025
APPARATUS FOR ERECTING PREFABRICATED PANELS AND THE LIKE
Norman R. Toffolon, Plainville, Conn., assignor, by direct and mesne assignments, to Norman R. Toffolon and Louis Toffolon, as joint tenants
Application Sept. 29, 1966, Ser. No. 589,159, now Patent No. 3,333,322, dated Aug. 1, 1967, which is a continuation-in-part of application Ser. No. 138,520, Sept. 15, 1961. Divided and this application May 10, 1967, Ser. No. 637,553
Int. Cl. B25j 3/00
U.S. Cl. 214—1                                12 Claims

ABSTRACT OF THE DISCLOSURE

Apparatus for erecting prefabricated panels comprising a beam assembly for supporting counterbalancing similar panels at opposite ends and accommodating manipulation of the panels whereby they can be picked up, transported, and swung about one or more axes for erection in situ.

CROSS-REFERENCE TO RELATED APPLICATION

This application is a division of my copending application Ser. No. 589,159, now issued as U.S. Patent No. 3,333,322, filed Sept. 29, 1966, entitled "Method and Apparatus for Erecting Prefabricated Panels and the Like." Ser. No. 589,159 is a continuation-in-part of of application Ser. No. 138,520, filed Sept. 15, 1961, now abandoned, entitled "Method and Apparatus for Erecting Prefabricated Panels or the Like."

BACKGROUND OF THE INVENTION

Apparatus available in the past has been cumbersome and expensive particularly where it has been necessary to handle and counterbalance in the apparatus per se relatively large and heavy panels. There is no known instance of counterbalancing by using the weight of a second identical panel for such purposes.

SUMMARY OF INVENTION

One object of the present invention is to provide an apparatus for erecting prefabricated panels or the like which can be employed with speed and facility and which requires only relatively small, lightweight and inexpensive auxiliary supporting equipment, the costs encountered in erecting the panels or the like thus being greatly reduced.

Another and a more specific object of the invention is to provide panel erection apparatus wherein a pair of opposing panels are handled simultaneously and in such a manner that the weight of one panel balances or at least approximtely balances the weight of the other.

A still further and a more specific object of the invention is to provide panel erection apparatus of the type mentioned and which is adapted to lift a pair of opposing prefabricated panels or the like and to effect or at least accommodate relative swinging movements of the panels as required for erection of the same.

The drawings illustrate the method of the invention and show several embodiments of the apparatus of the invention and such embodiments will be described; but it will be understood that various changes may be made from the constructions disclosed, and that the drawings and description are not to be construed as defining or limiting the scope of the invention, the claims forming a part of this specification being relied upon for that purpose.

BRIEF DESCRIPTION OF THE DRAWINGS

FIG. 3 is a perspective view illustrating a further step in erection wherein the panels are swung about generally vertical axes to bring lower edge portions thereof into adjacent relationship.

FIG. 4 is a front view showing the panels in broken line positions wherein they are commencing pivotal movement about generally horizontal axes, and in full line positions wherein they have completed such pivotal movement so as to reach upright attitudes.

FIG. 5 is a perspective view showing inner surfaces of adjacent panels and illustrating the manner in which a lower edge portion of a panel can be secured in place.

FIG. 7 is an enlarged fragmentary horizontal section taken generally as indicated at 7—7 in FIG. 6.

FIG. 9 is a perspective view showing an erection beam assembly comprising a preferred embodiment of the invention.

FIG. 10 is a fragmentary perspective showing a portion of the erection beam assembly of FIG. 9 in position for holding an upright panel.

FIG. 11 is a transverse vertical section through one end portion of the erection beam assembly of FIG. 9, the numerals 11—11 in FIG. 9 indicating generally the location of the section.

FIG. 15 is a perspective view showing a portion of a prone panel and a first alternative erection beam assembly.

FIG. 16 is a fragmentary vertical transverse section taken generally as indicated at 16—16 in FIG. 15, but with the associated panel in an upright position.

FIG. 17 is a perspective view showing a portion of a prone panel and a second alternative erection beam assembly.

FIG. 18 is a perspective view similar to FIG. 2 but showing a third alternative erection beam assembly and an associated power operated vehicle holding a pair of opposing panels in elevated positions.

FIG. 20 is a perspective view similar to FIGS. 18 and 19 with panels fully erected and ready for connection with each other and their supporting footings or the like.

FIG. 22 is an enlarged fragmentary sectional view taken generally as indicated at 22—22 in FIG. 21 but showing a portion of a panel connected with the beam assembly.

DESCRIPTION OF PREFERRED EMBODIMENTS

Generally speaking, erection of panels in accordance with the present invention involves the arrangement of a transversely opposing pair of similar prefabricated panels or the like in transversely spaced prone positions with their inner sides or surfaces facing upwardly. A panel erection apparatus which has two similar transversely spaced panel support means each of which is adapted to be attached to and to accommodate relative movement of a panel is provided and the panels are attached respectively at their inner sides to said transversely spaced support means on the erection apparatus and the apparatus is then utilized to lift the panels in a generally vertical direction. The panels are lifted by the erection apparatus in such manner that the weight of one panel balances or at least approximately balances the weight of the other. Finally, while held by the erection apparatus, the panels are manipulated and moved relative to the apparatus and to each other in such manner as to assume the desired erected positions or attitudes.

Figure 1:
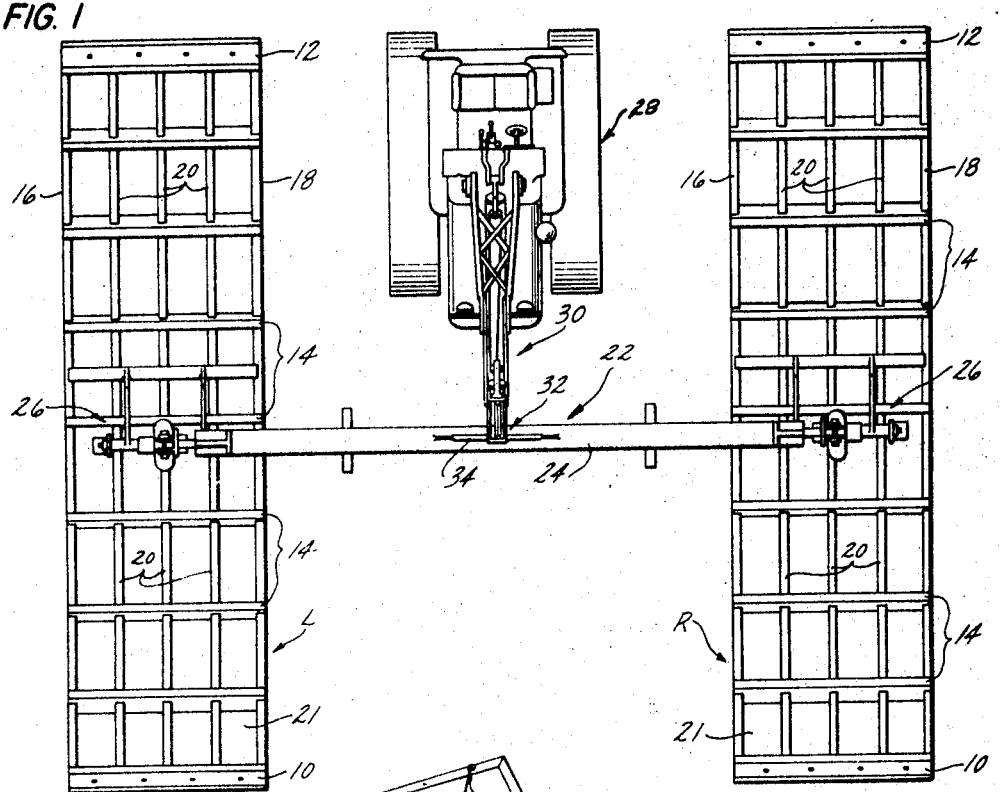
FIG. 1 is a plan view showing a pair of opposing prefabricated panels and one embodiment of the erection apparatus of the invention, the panels being shown at rest and substantially in prone positions.
Figure 2:
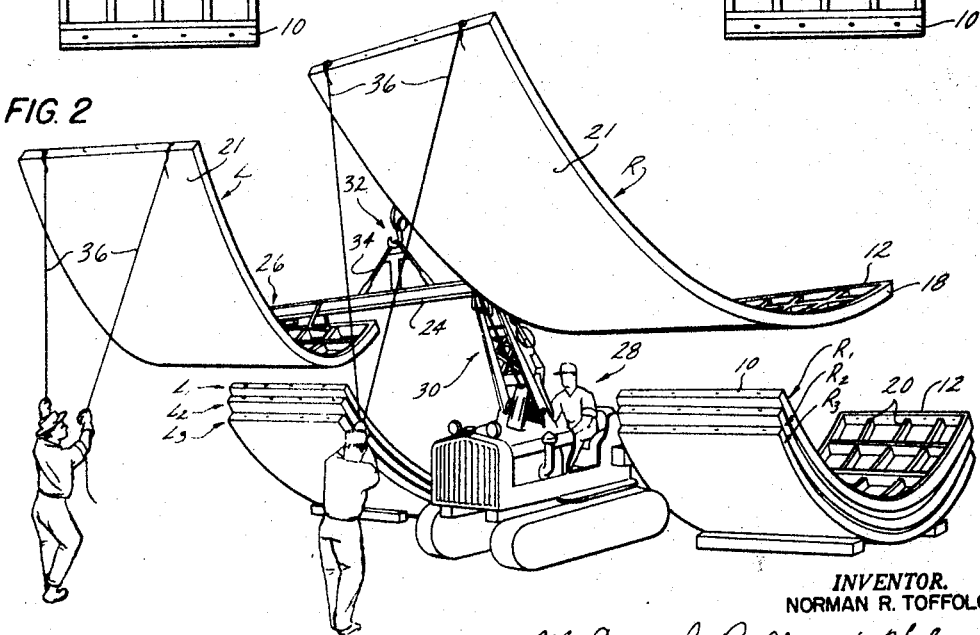
FIG. 2 is a perspective view similar to FIG. 1 showing the panels in elevated positions and held by the erection apparatus.

In FIG. 1 it will be observed that first and second or left- and right-hand panels L and R of a transversely opposing pair of panels are arranged in transversely spaced positions and preferably with their inner sides or surfaces facing upwardly. The panels may be placed individually on the ground or on suitable supports or, preferably, the panels are placed in stacked relationship with similar panels $L_1$, $L_2$, $L_3$ and $R_1$, $R_2$, $R_3$ disposed therebeneath as indicated in FIG. 2. When placed in stacked relationship as shown in FIG. 2, the panels are handled and erected successively in top-to-bottom order.

While the apparatus of the invention is particularly well suited to the type of prefabricated panels shown, other types of panels as well as large open frames and the like can be accommodated as mentioned above. The particular panels shown are identical in construction and each of the panels includes transverse base and peak frame members 10 and 12 and a plurality of similar transverse intermediate frame members 14, 14. Left and right-hand longitudinal side frame members 16 and 18 cooperate with intermediate longitudinal frame members 20, 20 and with the aforesaid transverse frame members to provide rigid support for a skin or covering 21. The panels are generally rectangular and substantially elongated in plan form and viewed from the side they have a shallow arcuate contour.

Still referring to FIGS. 1 and 2, it will be observed that a panel erection apparatus shown comprises an erection beam assembly indicated generally at 22. Generally, said assembly comprises an erection beam 24 which extends transversely and which carries a pair of similar panel support means, 26, 26 at its opposite end portions. Also included in the erection apparatus is a means for lifting the panels and, as shown, said means may comprise a boom equipped tractor 28. A boom 30 on the tractor 28 has an associated cable and hook arrangement 32 adapted for connection with a generally triangular harness member 34 mounted centrally on the erection beam 24. Obviously, this arrangement provides for the simultaneous raising and lowering of the erection beam 24, the panel support means 26, 26 and the panels L and R attached to the support means. Additionally, the erection beam assembly and the panels can be transported horizontally by suitable ground movement of the tractor 28.

The erection apparatus will be described more fully hereinafter, but it is important to note here that connection of the panel support means 26, 26 with the panels is judiciously effected. The panels are connected with the panel support means 26, 26 at their inner sides and, preferably, such connections are effected approximately at the respective centers of gravity of the panels. While not so shown in the drawings, it is the presently preferred practice to effect connection of a panel support means with its panel approximately at the center of gravity but spaced slightly therefrom such that the panel will be slightly bottom heavy when it is subsequently moved to an upright position in a manner to be described. It is found that panels which are slightly bottom heavy in their upright positions exhibit improved resistance to air currents and are readily manipulated so as to be secured in place.

When a pair of opposing panels, such as the panels L and R, have been attached to the support means 26, 26 the erection beam may be raised so as to lift the panels above the remaining panels in the stacks. Preferably lines are secured to the panels as at 36, 36 to provide for steadying of the same during elevation. Workmen holding lines 36, 36 may also steady the panels during transport of the same in generally horizontal attitudes or positions as illustrated in FIG. 2.

In the preferred erection procedure, the panels are brought to the erection site and manipulation of the same for erection is effected while they are held by the erection apparatus of the invention. The weight of one panel balances or at least approximately balances the weight of the other during lifting of the panels, during transport, and during relative movements of the panels which are effected to erect the same. The panels are swung upwardly about generally horizontal axes to upright positions during erection and, with the panels shown in FIGS. 1 through 17, upward swinging movement thereof is preceded by sidewise swinging or pivotal movement about a generally vertical axis. That is, with the substantially elongated panels L and R shown, the panels are lifted and transported in generally parallel relationship as shown. Thereafter, the lower edge portions of the panels in FIGS. 1 through 17 are swung inwardly toward each other as illustrated in FIG. 3 preliminary to the upward swinging movement of the panels. As is also illustrated in FIG. 3, lower edge portions of the panels L and R can be coveniently swung inwardly into adjacent relationship when the panels are lowered slightly from their transport positions so as to be grasped readily by workmen. The panels may be swung to the position shown in FIG. 3 simultaneously and then swung upwardly simultaneously or, alternatively, the panels may be erected individually, it being noted that the condition of balance or approximate balance is not destroyed in either case.

In FIG. 4 it will be observed that the panels L and R are swung about generally horizontal axes to upright positions by moving the aforementioned lower end portions thereof outwardly and downwardly. Preferably, and as indicated in FIG. 4, the erection beam 24 is raised after the generally horizontal swinging movement of the panels is effected as in FIG. 3. If desired, however, both the horizontal and vertical swinging movements of the panels may be effected with the erection beam at the relatively high position of FIG. 4.

Figure 19:
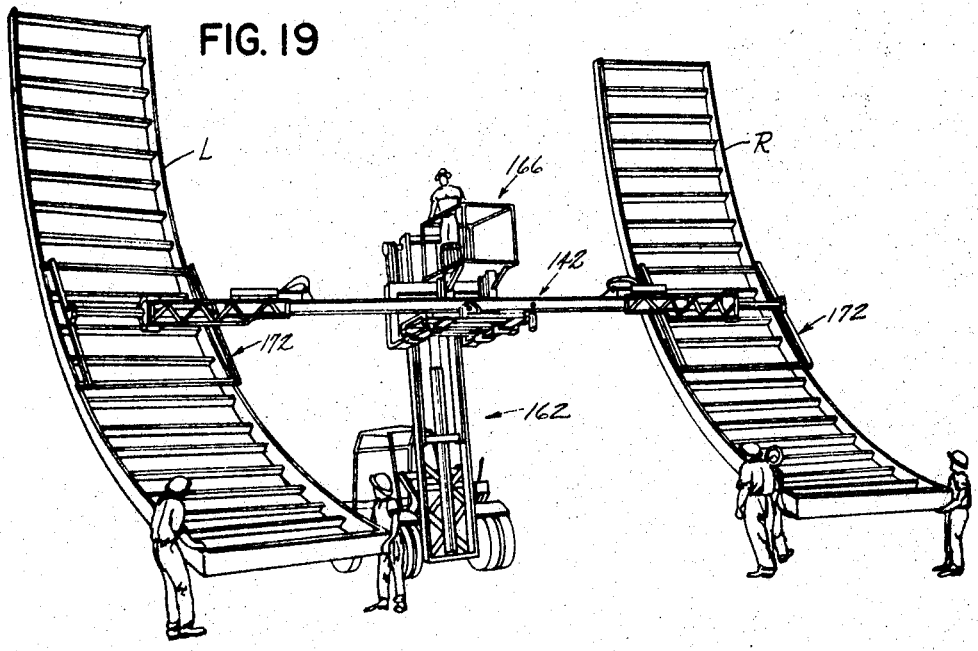
FIG. 19 is a perspective view similar to FIG. 18 showing the apparatus and panels with the panels partially erected.
Figure 20:
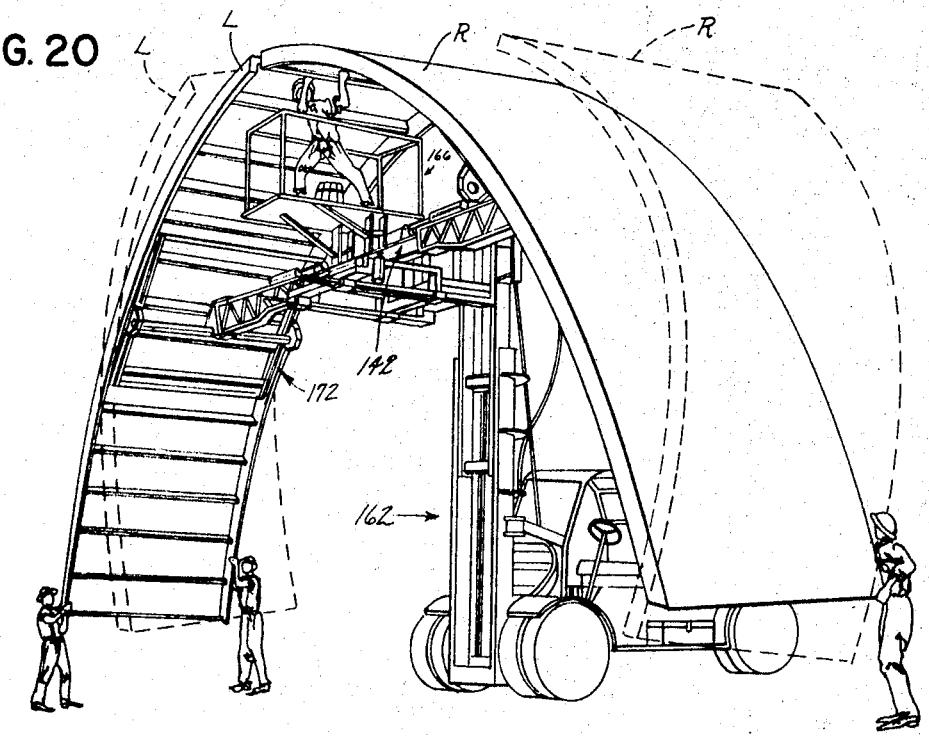

The panels L and R in FIGS. 18 through 22 are swung first about generally horizontal axes to the positions of FIG. 19, then about generally vertical axes to the broken line position of FIG. 20, and finally about generally horizontal axes to the FIG. 20 full line or erected portion. Thus, compound swinging movements to erection are effected with each apparatus of the invention.

When the panels have been swung to upright positions through either of the aforesaid paths, their upper edge portions are in adjacent relationship as illustrated in FIGS. 4 and 20 and they are at least approximately in position to be secured in place. In FIG. 5, the panel R is shown secured in position at its lower end portion. As will be observed, the transverse base member 10 of each panel is provided with a suitable series of openings for receiving upright bolts 38, 38 secured in a foundation member 40. A succeeding right-hand panel $R_1$ is shown in position wherein workmen are entering the bolts 38, 38 in the openings in its base member 10. During this portion of the erection operation, careful and precise manipulation of the panels is essential. Therefore, and in accordance with one aspect of the invention, a means is provided for moving the panels transversely and thereby properly aligning the bolts 38, 38 with the openings in the transverse base members 10, 10 thereof. Such means will be described more fully hereinafter and for the present it will suffice to say that the panel support means 26 is employed in effecting the necessary precise transverse movements of the panels. As indicated in FIG. 5, such transverse panel movements may be controlled by a workman through manipulation of an elongated crank member 42 connected with the panel support means 26.

Figure 6:
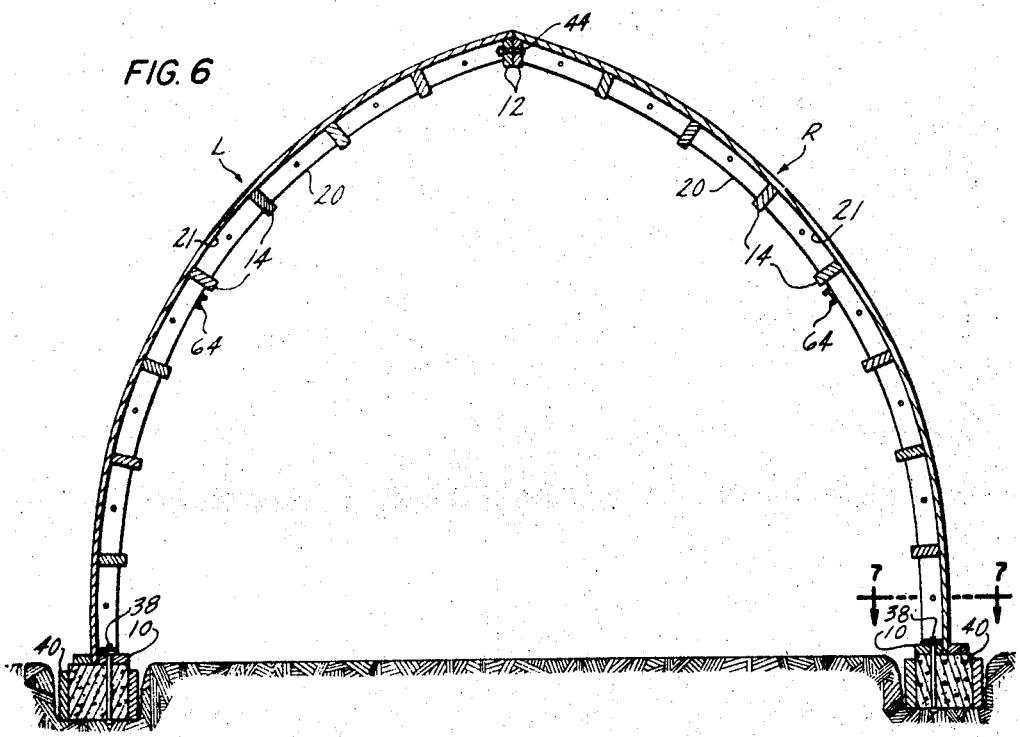
FIG. 6 is a transverse vertical section showing a pair of transversely opposing panels finally secured in place.

When a pair of transversely opposing panels L and R have been secured in position at lower end or base portions by entering bolts 38, 38 in the openings in their base members 10, 10, a peak attachment may be effected as illustrated in FIG. 6. That is, the transverse peak members 12, 12 of the panels may be rigidly connected together by means of suitable bolts 44, 44 one shown. Adjacent panels, such as the panels R and R₁ in FIG. 5, may then be connected together by means of suitable bolts 46, 46 as illustrated in FIG. 7. That is, adjacent side frame members 16 and 18 of the adjacent panels can be secured together by means of the bolts 46, 46 whereby to secure the panels.

Figure 8:
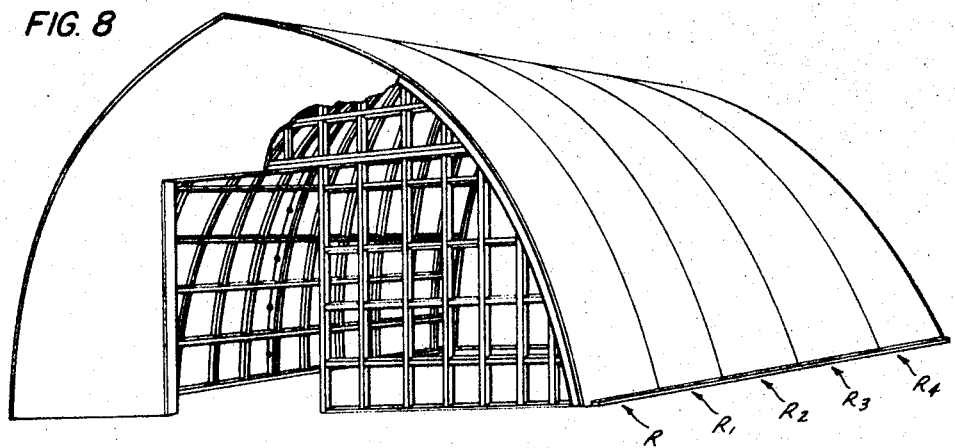
FIG. 8 is a perspective view showing a temporary building employing a plurality of panels erected with apparatus of the present invention.

From the foregoing it will be apparent that several pairs of opposing panels can be erected in succession to form a building as illustrated in FIG. 8, end walls of the building being provided by suitable prefabricated panels or by other means. The apparatus of the invention is desirably simple and provides for full control and convenient manipulation of the panels at all times. Manipulation of the panels may be effected manually as described or, in the alternative, the erection apparatus of the invention can be adapted for a wholly mechanical erection operation. Irrespective of such adaption of the erection apparatus, the provision for balancing or at least approximately balancing the weight of one panel with the weight of the opposing panel eliminates the need for heavy and expensive auxiliary supporting equipment.

The aforementioned erection beam assembly 22 is shown in detail in FIGS. 9 to 14. The beam 24 of said assembly may take the form of a conventional I-beam as shown and, in addition to the aforementioned harness 34, the beam may be provided with a pair of triangular legs 48, 48. The panel support means 26, 26 carried by the beam 24 are or may be identical in construction and, accordingly, only one of said means need be described in detail.

Referring particularly to the right-hand panel support means 26 in FIG. 9, it will be observed that there is provided a means or member 50 adapted for connection with a panel. Said means or member is connected with the beam 24 for pivotal movement at least about a generally horizontal axis and, as shown, said means or member is adapted for pivotal movement about both generally horizontal and vertical axes relative to the erection beam 24. Such pivotal movements are employed during erection of a connected panel as mentioned above.

Figure 12:
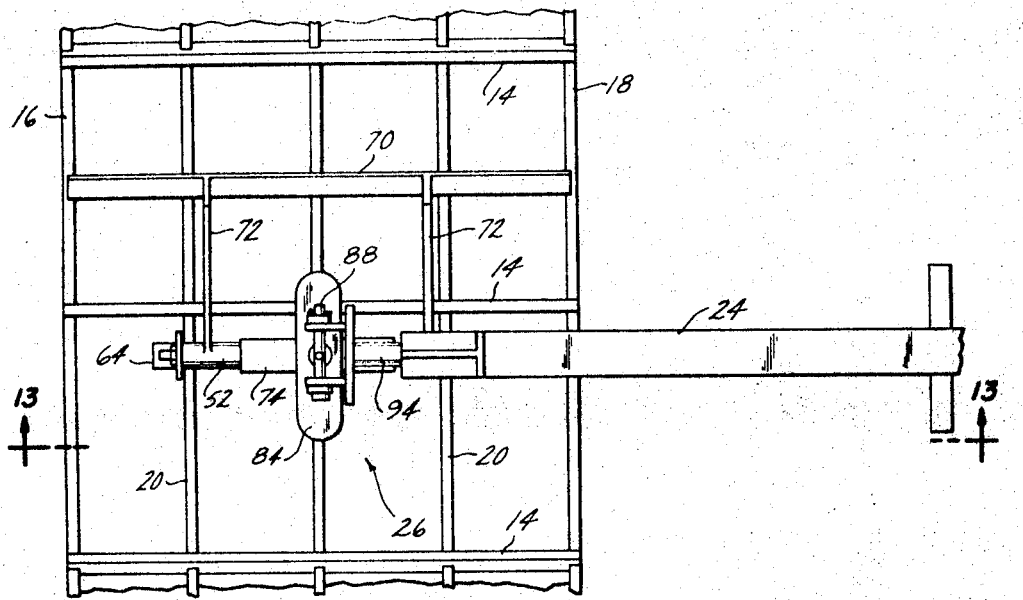
FIG. 12 is a plan view of one end portion of the erection beam assembly of FIG. 9 in connected relationship with a prone panel.
Figure 13:
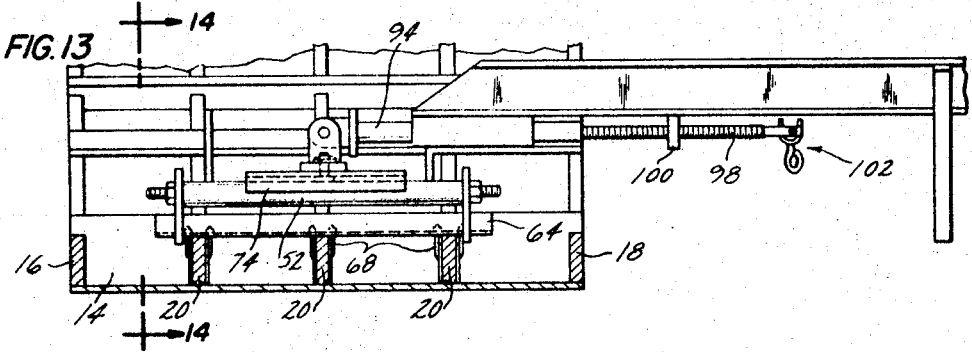
FIG. 13 is a transverse vertical section taken generally as indicated at 13—13 in FIG. 12.
Figure 14:
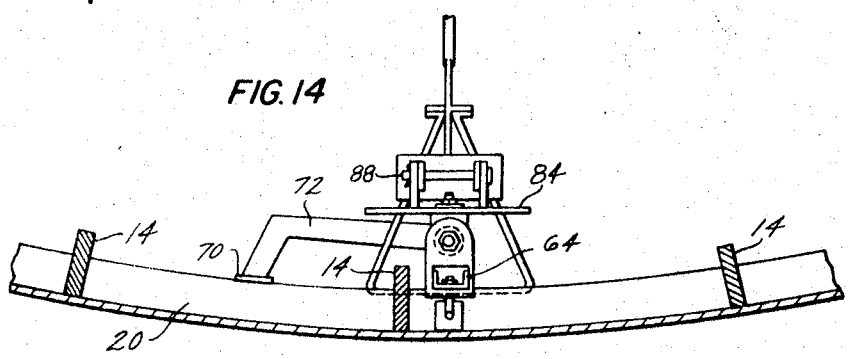
FIG. 14 is a longitudinal vertical section taken generally as indicated at 14—14 in FIG. 13.

Included in the panel connecting or holding means or member 50 of each panel supporting means 26 is a tubular element 52 which pivotally supports a pair of depending plates 54, 54 disposed at its opposite end portions. As best shown in FIG. 11, each of the plates 54 has a stud 56 operatively associated with and pivotally supporting the same. The studs 56, 56 are entered respectively in opposite end portions of the tubular element 52 and in suitable openings 58, 58 in upper portions of the plates 54, 54. Nuts 60, 60 secure the plates axially on the studs 56, 56, but permit the same to swing thereabout. Openings 62, 62 in lower portions of the plates 54, 54 are shown as being generally rectangular and in aligned relationship so as to receive opposite end portions of a small channel 64. As best shown in FIGS. 12 to 14, the channel 64 may be fixedly secured to the intermediate longitudinal frame members 20, 20 of a panel by means of U-bolts 68, 68 entered in suitable openings in the members, FIG. 13. With the end portions of the channel 64 entered in the openings 62, 62 in the depending plates 54, 54, the associated panel is secured to and supported by the tubular element 52. The panel can, however, swing about the axis of said element through pivotal movement of the plates 54, 54 about their supporting studs 58, 58. Such swinging movement of the panel is limited by means of a brace member 70, FIG. 9. Similar arms 72, 72 fixedly secured to the tubular element 52 support the brace member 70 so that inner surfaces of the frame members 20, 20 engage or at least approximately engage said brace member as illustrated in FIG. 14.

A short inverted channel 74 fixedly secured to the tubular element 52, as by suitable welding, supports said element and the aforedescribed parts attached thereto. As best shown in FIG. 11, the channel 74 has a central opening 76 which receives a vertical pivot pin 78. Said pin 78 has an enlarged head 80 which engages a lower surface of the body of the channel 74 to vertically support the same and its attached parts. An upper portion of the pin 80 is entered in a suitable central opening 82 in the body portion of a bracket 84. Above said body portion of the bracket 84, a nut or nut means 85 engages the pin 80 and the upper surface of the bracket body portion to vertically support the pin and the parts held thereby. Thus, it will be seen that the channel 74 and its supported parts can be swung pivotally and substantially in a horizontal plane about the vertical axis of the pin 80.

The bracket 84 has formed thereon a pair of upstanding arms or ears 86, 86 which are pivotally connected with a horizontally extending pivot pin 88. Also connected with and supporting the pin 88 are spaced arms 90, 90 of a second bracket 92. The said second bracket 92 is fixedly connected with and supported at an outer end portion of a tubular slide rod 94 as by means of suitable welding. A sleeve 96, FIG. 11, slidably receives the rod 94 and is fixedly secured to the erection beam 24. Thus, the entire panel support means 26 is supported for sliding movement relative to the erection beam 24 and in an endwise direction with respect to the beam. Such sliding movement of the panel support means can effect the aforementioned precise transverse movements of a panel as required to secure the panel in place after it has been raised to an upright position.

While power operated means may be employed to effect sliding movement of the rod 94 within its sleeve 96 and the resulting transverse movement of a panel, the FIG. 9 apparatus employs manually operable means. Thus, and as best shown in FIG. 11, an inner end portion of the slide rod 94 has a lead screw 98 connected thereto. The lead screw 98 extends through and is threadedly engaged with a nut 100 fixedly secured to the erection beam 24. At the inner end of the lead screw 98 a universal coupling 102, which may be conventional in form, is provided. The universal coupling 102 is connected with the aforementioned elongated crank 42, FIGS. 5 and 11. Thus, it will be seen that a workman can trun the crank 42 to rotate the lead screw 98 and to thereby effect sliding movement of the rod 94 relative to the erection beam 24.

In using the erection beam assembly of FIGS. 9 to 14, channel members 64, 64 are attached to the panels so that lifting forces are applied to the panels approximately at their centers of gravity or, so that the panels will be slightly bottom heavy as aforesaid when raised to upright positions. Connections between the panel support means 26, 26 and the channels 64, 64 may then be effected by entering opposite end portions of the channel members 64, 64 in the openings 62, 62 in the depending plates 54, 54. Obviously, removal of one end plate 54 may be conveniently accomplished in the operation of entering the end portions of the channel members in the plate openings. During attachment, the tubular elements 52, 52 extend in parallel or substantially in parallel relationship with respect to the erection beam 24, as shown in FIG. 9. The panels are approximately in prone positions or horizontal attitudes and their longitudinal frame members 20, 20 may be in loose engagement in slightly spaced relationship with the brace members 70, 70.

When the erection beam assembly 22 has been raised to lift the panels and after transport of the panels to the erection site, the panels can be swung horizontally as illustrated in FIG. 3 through pivotal movement of the channels 74, 74 about their pivot pins 78, 78. Thereafter, the panels can be swung to upright positions by first swinging the frame members 20, 20 into firm engagement with the brace members 70, 70 and by then effecting swinging movement of the tubular elements 52, 52, the channel members 74, 74, and the brackets 84, 84 about the horizontal pivot pins 88, 88. FIG. 10 illustrates the condition of the right-hand support means 26 when its panel is upright. When it is desired to effect transverse movements of the panels to secure them in place, the elongated cranks 42, 42 can be rotated to slide the entire panel support means 26, 26 inwardly or outwardly relative to the erection beam 24 as required.

In FIGS. 15 and 16, a first alternative erection beam assembly is illustrated. The said beam assembly is particularly well suited to use in the erection of relatively compact and lightweight panels having substantial inherent rigidity. Said assembly comprises an erection beam 24a in the form of an I-beam and which is provided with a pair of members 104, 104 spaced approximately equally from the center of the beam. The members 104, 104 are generally rectangular in cross section and are hollow so as to receive the forks of a forklift vehicle. Panel support means 26a, 26a mounted at opposite end portions of the erection beam 24a are substantially identical and only one of said means need be described in detail.

The right-hand panel support means 26a in FIG. 15 is shown in connected relationship with a panel disposed therebeneath. It will be observed that a connecting means or member of the support means includes a pair of hooks 106, 106. The hooks 106, 106 are engaged with a small pin 108 entered in a suitable opening in a longitudinal frame member 20 of the panel. Depending flexible members 110, 110 connecting the hooks 106, 106 with the erection beam 24a are shown as comprising chains connected with the hooks and with an eye member 112, FIG. 16. The eye member 112 has a shank 114 pivotally entered in suitable openings in a hollow crossbar 116 and a bar supporting tube 118. An upper end portion 120 of the eye member 112 is enlarged so as to provide vertical support for the eye member and for the connected chains and hooks. The tubular support member 118 is fixedly secured to the erection beam 24a as by means of suitable welding and the crossbar 116 is entered in said member and similarly secured thereto.

Referring first to FIG. 15, it will be seen that the hooks 106, 106 can be readily engaged with a pin 108 secured in place in a longitudinal frame member 20 of a prefabricated panel. When the hooks are initially secured to the pin 108, they lie substantially in vertical longitudinal planes or, in planes extending at right angles with respect to the erection beam 24a. When the panels have been lifted and transported to the erection site, horizontal swinging movement of the panels as illustrated in FIG. 3 can be effected by pivotal movement of the eye member 112 through approximately 90°. That is, the hooks 106, 106 can be swung from their aforementioned vertical longitudinal planes to vertical transverse planes substantially parallel with the erection beam 24a, as shown in FIG. 16. The panels may then be swung upwardly for erection and during such upward swinging movement the frame members 20, 20 of the panels can engage the crossbars 116, 116 so as to pivot thereabout as shown in FIG. 16.

A second alternative form of erection beam assembly 22b is shown in FIG. 17. Said assembly is particularly well suited to large panels which are somewhat flexible due to their size and which require rigid support from the erection apparatus. The assembly is substantially identical with that shown in FIGS. 9 to 14 except for the provision of a rigid elongated panel supporting frame 122 on each of its panel support means 26b. The said panel support means are identical and only one need be described.

Referring particularly to the right-hand panel support means 26b, it will be observed that a bracket 84b is substantially identical with the bracket 84 of the panel support means 26 shown in FIGS. 9 to 14. Said bracket, however, holds a circular pad 124 rather than the channel 74 of the aforedescribed panel support means. The pad 124 is shown as being disposed atop a second pad 126 which is pivotally supported by the bracket 84b and the pad 124 and which is swingable in a generally horizontal plane about a pivot pin 78b. The rigid frame 122 is attached to and is supported by the pad 126.

The frame 122 may vary widely in form, but as shown, said frame is generally rectangular in plan form and has spaced lower side members 130, 130 of shallow concave configuration when viewed from above. The members 130, 130 conform generally to the contour of the panels described above and said members are supported by transverse end frame members 134, 134. Center frame members 136, 136 are fixedly connected with the side frame members 134, 134 and with the lower pad 126. Additionally, a plurality of diagonally extending bracing members provide for rigidity and lightness of the frame.

The frame 122 is, in accordance with one aspect of the invention, adapted for connection with a panel at a plurality of longitudinally spaced locations so as to provide for rigid support of the panel over a major portion of its inner surface. As shown, each end frame member 132 carries a pair of depending ears 138, 138 at each end portion thereof. Additionally, the concave lower side frame members 130, 130 have depending pairs of ears 140, 140 secured substantially centrally thereof. As illustrated, the ears 138, 138 and the ears 140, 140 can be secured to intermediate transverse frame members 14, 14 of panels such as the panels L and R whereby to attach the panel support means 26b to the panel and to provide rigid support for the panel.

The mode of use of the erection beam assembly 22b is substantially the same as that described for the beam assembly 22. Attachment of the panels to the panel support means 26b is effected with the panel support means in the positions shown FIG. 17. Thereafter, pivotal movements of the panels can be effected first in horizontal planes with the pivot pins 78b, 78b operative and then in vertical planes with the pivot pins 88b, 88b operative. Transverse panel movements required for securing the panels in place can then be effected by means of elongated cranks 42b, 42b as described for the beam assembly 22.

In FIGS. 18–22 there is shown a third alternative form of the erection beam assembly of the invention. As mentioned above, the panels are swung about horizontal and vertical axes with the FIGS. 18–22 apparatus in a manner somewhat different from that in which the panels are swung by the aforedescribed beam assemblies. Further, the erection beam assembly of FIGS. 18–22 includes power operated mechanisms providing for power rather than manual manipulation of the panels in lifting, erecting and connecting together a pair of opposing panels.

Figure 21:
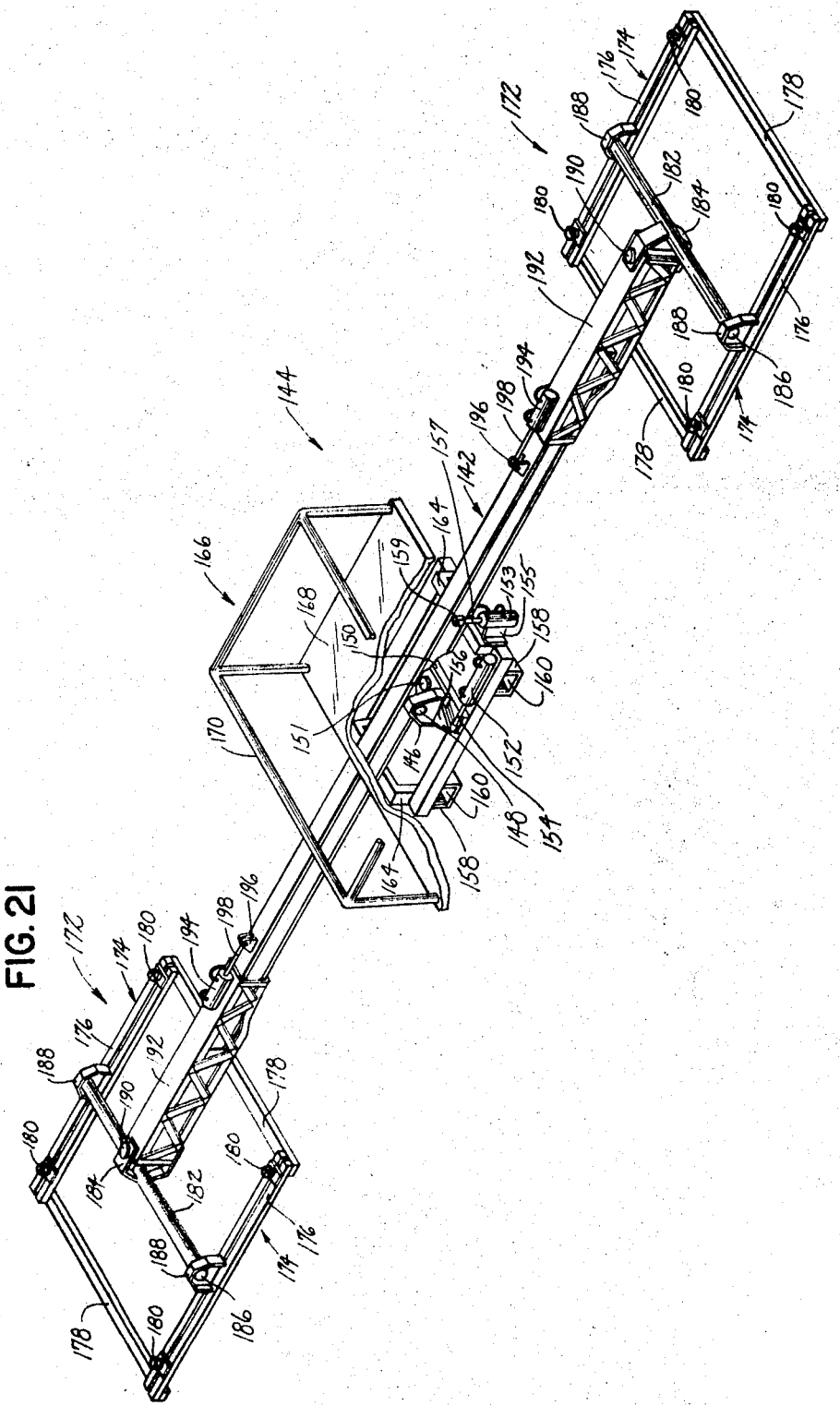
FIG. 21 is an enlarged perspective view of the third alternative erection beam assembly.

Referring now particularly to FIGS. 21 and 22, an elongated beam 142 of the erection beam assembly 144 takes the form of a conventional I-beam and is pivotally mounted centrally by means of a yoke and a horizontal pivot pin 146 and 148. The yoke 146 is in turn supported for pivotal movement of the beam in a generally horizontal plane by a central supporting section of the beam 150. That is, a vertical pivotal pin 151 is provided beneath the yoke 146 and accommodates slight horizontal pivotal movement of the yoke for similar movement of the beam 142.

A fluid operable means for effecting horizontal pivotal movement of the yoke and beam may take the form of a conventional hydraulic cylinder 152 mounted on the beam central section 150 and having a rod 154 connected with a bracket 156 which is in turn attached to the yoke 146.

The central supporting section 150 of the erection beam 142 also includes a pair of transversely spaced channel members 158, 158 defining suitable openings 160, 160 for receiving the fork member of a forklift truck 162 best shown in FIGS. 18 and 19. Disposed above the members 158, 158 are members 164, 164 for limiting pivotal movement of the beam 142 about the pivot pin 148 secured by the yoke 146.

An hydraulic cylinder 153 is preferably provided for attachment to one of the members 164 by means of a bracket 155 which accommodates relative horizontal movement thereof. A rod 157 connected with the cylinder 153 has its opposite end portion connected with a bracket 159 on the beam 142. Thus, limited and controlled vertical swinging movement of the beam 142 about the pin 148 is provided for.

Mounted atop the central portion of the erection beam 142 is a platform 166 having a base 168 and side or rail members 170, 170. As will be apparent, a workman standing on the base 168 of the platform 166 can conveniently direct the erection of panels by the beam assembly and can readily connect together upper end portions of panels such as L, R illustrated in FIG. 20. Still further, control means for various power operated mechanisms, such as the cylinder 152 are preferably located in the platform 166, whereby to enable the workman not only to direct but to control the erection of panels.

At opposite ends of the beam 142 similar panel support means 172, 172 are provided and each of said means includes a means or member 174 adapted for connection with the inner surface of a panel to be erected. The means or member 174 preferably comprises a generally rectangular frame as shown with slotted members 176, 176 connected by pad members 178, 178. The slotted members 176, 176 carry panel adjusting bolts or hooks 180, 180 as best illustrated in FIG. 22 and the pad members 178, 178 are adapted to engage the panel as shown.

An elongated tube or hollow rod 182 carries a yoke 184 at a central portion thereof and rotatably receives a pivot shaft 186 therewithin. Opposite end portions of the pivot shaft 186 are received in suitable openings in brackets 188, 188 mounted on the slotted members 176, 176. Thus, the panel connecting means or members 174, 174 can be rotated about horizontal axes as provided for by the shaft 186.

For pivotal panel movement or rotation about vertical axes each yoke 184 is mounted upon a short vertical pivot pin 190 and in turn supported by a horizontal and transversely movable cage 192. That is, each cage 192 mounted upon its corresponding end portion of the beam 142, is slidable therealong for limited horizontal movement as may be required in horizontally adjusting the position of a panel supported thereby. As shown, each cage 192 carries fluid operable means in the form of a hydraulic cylinder 194 and a suitable bracket 196 is provided on the beam 142 adjacent the cage and cylinder. A rod 198 associated with the cylinder is connected with the bracket 196 to provide for desired movement or in-and-out adjustment of the cage 192 along the end portion of the beam 142. As mentioned above, control means for the cylinder 194 is preferably located in or on the platform 166. Such means as well as connecting lines extending therefrom to the cylinders may be conventional and neither illustration nor description thereof is deemed necessary for full understanding of the present invention.

Still referring to the cage 192, and particularly to FIG. 22, it will be obvious that an inner portion of each cage embraces the beam 142 rather closely, whereas an outer portion thereof is substantially larger in cross section, a step being provided at 200. The cages 192, 192 are so constructed to provide for slight vertical movement or adjustment of the panels as may be needed in effecting connection of the panels with their footings or with each other. Thus, the "loose" fit of the cage 192 on the beam 142 provides for slight movement of the cage relative to the beam as indicated by the broken line 202.

Operation of the apparatus of FIGS. 18–22 will be apparent from the foregoing. The panels, such as L and R, are initially elevated as shown in FIG. 18 by appropriate operation of the forklift truck. Thereupon, the panels can be transported to the erection location, swung upwardly about horizontal axes to the FIG. 19 position, then swung about vertical axes to the broken line FIG. 20 position, and then again swung about horizontal axes to the full line FIG. 20 position. Power controlled movements under regulation of a workman on the platform 166 can provide for precise adjustment of the position of the panels in unison and with respect to each other, whereby to connect the same together and to lower and mount the same on their footings as illustrated in FIG. 20.

What is claimed is:

1. Apparatus for erecting an opposing pair of similar prefabricated panels or the like arranged in transversely spaced prone positions with their inner sides facing upwardly, said apparatus comprising a pair of transversely spaced panel support means disposed respectively above the panels and adapted to be attached to inner sides thereof and including fixed axis pivot means for accommodating pivotal movements thereof about both generally horizontal and generally vertical axes, an erection beam extending transversely and connected adjacent end portions with said panel support means and adapted to lift the same together with panels attached thereto whereby to permit the panels to be erected by selected pivotal movements about said generally horizontal and vertical axes with the weight of one panel serving to balance the weight of the other, at least one of said panel support means including a transverse adjustment device connected with the erection beam and operable with a panel on said support means to effect transverse adjustment of said one support means and panel independently of said other support means and panel, and a power operated vehicle connected in supporting relationship with said erection beam and operable to raise and lower and to transport said erection beam, support means, and attached panels.

2. Apparatus for erecting an opposing pair of similar prefabricated panels or the like as set forth in claim 1, wherein said power operated vehicle takes the form of a forklift truck, and wherein said erection beam is provided at a central portion thereof with a pair of spaced horizontally extending openings for receiving the fork member of said forklift truck.

3. Appartus for erecting an opposing pair of similar prefabricated panels or the like as set forth in claim 2, wherein said erection beam is provided at a central portion and above said horizontally extending openings with platform means adapted to support a workman for controlling operation of the apparatus and for connecting together contiguous upper end portions of panels erected thereby.

4. Apparatus for erecting an opposing pair of similar prefabricated panels or the like as set forth in claim 1, wherein each of said panel support means comprises first and second members which are respectively pivotally connected with the erection beam and connectible with a panel at its inner side and which are pivotally connected together for swinging movement of the latter and a connected panel about generally horizontal and vertical axes.

5. Apparatus for erecting an opposing pair of similar prefabricated panels or the like as set forth in claim 4, wherein each said first member is connected with its associated erection beam end portion for slight generally vertical adjustment as well as transverse adjustment whereby to accommodate minor adjustment of panel position and to facilitate the fixing in place of the panels.

6. Apparatus for erecting panels or the like as set forth in claim 1 and which includes a manually operable transverse adjustment device associated with each of said panel support means for effecting independent transverse adjustments of the support means and panels supported thereby.

7. Apparatus for erecting panels or the like as set forth in claim 1 and which includes a fluid cylinder operable transverse adjustment device associated with each of said panel support means for effecting independent transverse adjustments of the support means and panels supported thereby.

8. An erection beam assembly for use in erecting an opposing pair of similar prefabricated panels or the like arranged in transversely spaced positions, said assembly comprising a transversely extending beam adapted to be held with opposite end portions disposed above the panels, and a pair of panel support means mounted respectively at said opposite end portions of said erection beam and each comprising a panel holding member adapted for attachment with the inner side of a panel and fixed axis pivot means connecting said member with the beam in such manner that a panel held thereby can be swung about generally vertical and horizontal axes, at least one of said panel support means including a transverse adjustment device connected with the erection beam and operable with a panel on said support means to effect transverse adjustment of said one support means and panel independently of said other support means and panel.

9. An erection beam assembly as set forth in claim 8 wherein said transverse adjustment device is manually operable.

10. An erection beam assembly as set forth in claim 8 wherein said erection beam is provided at a central portion with a pair of horizontally extending openings adapted to receive the fork member of a forklift truck, and wherein a platform is provided on said beam above said openings.

11. An erection beam assembly as set forth in claim 8 wherein said erection beam includes a central supporting section adapted for connection with a power operated vehicle and which supports the remaining portion of said beam for generally pivotal movement in a horizontal plane.

12. An erection beam assembly as set forth in claim 11 wherein a fluid cylinder means is provided to effect said generally pivotal movement of said remaining beam portion.

References Cited

UNITED STATES PATENTS

| 2,987,340 | 6/1961 | Mattera | 294—81 XR |
| 3,264,026 | 8/1966 | Hansen | 214—620 XR |
| 2,727,638 | 12/1955 | Sestan | 214—620 XR |

FOREIGN PATENTS 630,099  12/1961  Italy.

ROBERT G. SHERIDAN, Primary Examiner

F. E. WERNER, Assistant Examiner

U.S. Cl. X.R.

214—620; 294—81